Nov. 22, 1955   W. M. SHEETS   2,724,588

CUPPED ELASTIC PLUNGER-TYPE SNUBBER

Filed March 15, 1952

Re. 24654

INVENTOR.
William M. Sheets
BY
Atty.

United States Patent Office 2,724,588
Patented Nov. 22, 1955

2,724,588
CUPPED ELASTIC PLUNGER-TYPE SNUBBER

William M. Sheets, Portland, Oreg.

Application March 15, 1952, Serial No. 276,739

5 Claims. (Cl. 267—35)

My invention relates to a compression resistant spring device or "snubber" of the type used to reduce or absorb vibration in machinery, to slow and stop a moving part in a machine or gun or, in general, to serve any of the diverse uses to which a compression spring may be put. More particularly, my invention replaces the conventional metallic compression spring with a stacked plurality of resilient and deformable hollow cups which are arranged to resist compression forces both by the flexing of the deformable cups and by the compression of air which is entrapped therein.

One object of my invention is to provide a spring device or snubber of the above type in which the resilient and deformable elements are non-metallic and, further, are not subject to rubbing or to frictional wear whereby the resistance to compression and, thereby, the snubbing action will remain substantially uniform throughout a long period of time and in spite of repeated severe usage.

In general, shock absorbers, vibation dampers and the like may be thought of as mere specialized forms of a spring. Thus, a spring is a deformable device that recovers its original shape when released after deformation and a shock absorber or a vibration dampener also is a deformable device that recovers its shape. Certain types of shock absorbers, however, are somewhat different from a spring in that deformation and recovery of the original shape proceed at different rates. That is to say, recovery of the original shape is slow or purposely is delayed in some shock absorbers. For example, the typical automobile shock absorber works in opposition to the suspension leaf spring by giving quite easily when the spring is flexed but by delaying or inhibiting the rebound or recovery thereof toward the original shape. It is for these reasons that I term my invention a spring device or snubber rather than a shock absorber, the recovery of the original shape thereof taking place substantially without opposition and substantially at the same rate as the deformation.

To this end, my invention includes a hollow body member having a smooth cylindrical bore in which a movable piston member is mounted. Within the bore, a stacked plurality of resilient and deformable cup members are spaced one from another by a similar plurality of stiff circular disk members. Each circular disk member, in turn, is provided with a smooth plane face which terminates peripherally in an upstanding rim portion. The resilient cup members, on the other hand, each are provided with a conical hollow bore which is open to one end and which defines an air chamber. In assembling the spring device, each of the cup members is supported upon a corresponding one of the circular disks with the periphery of the conical bore air chamber resting flush against the plane face of the disk and closely bounded by the upstanding peripheral rim of the latter. Thus, when the piston member is moved within the cylindrical bore, the various disk members squeeze and compress the various cup members which are trapped therebetween. Such a squeeze and compression produces a dual resistance to compression or snubbing action in that the air entrapped within the hollow conical bore air chambers is compressed and the walls of the cup members are flexed and deformed, all at the same time. Further, by virtue of the fact that the cup members are made smaller than the smooth cylindrical bore and are retained against excessive lateral movement by the upstanding rim on each disk member, the cup members themselves never are permitted to contact the walls of the cylindrical bore and no rubbing or frictional wear of the flexing parts of the spring device is possible.

In accord with the above summary description, it is a further object of my invention to provide a compound deformable spring device which is arranged to employ flexing of a resilient member and compression of entrapped air without employing kinetic friction or rubbing, all to the end of compressibly and deformably absorbing vibration or stopping movement without inhibiting immediate return of the spring device to the original shape when the vibration or movement ceases.

These and other objects and advantages of my invention will be set forth in the following detailed description, taken in conjunction with the accompanying drawing, wherein.

Figure 3:
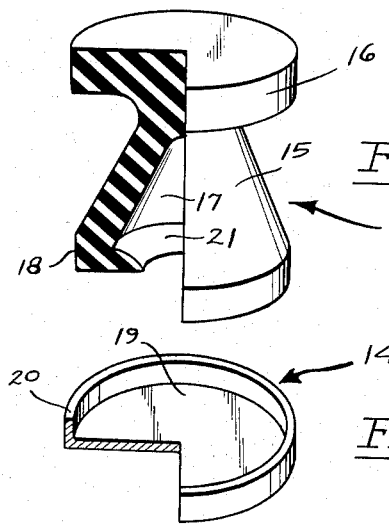
Figure 4:
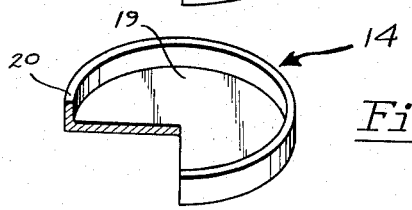

Fig. 3 is a detail view, also partially broken away, showing one of the resilient and deformable cup members together with the conical hollow bore thereof which is open to one end to define an inner chamber; and Fig. 4 is a detail view, partially in section, showing one of the circular disks and more particularly illustrating the smooth plane upper face thereof which terminates peripherally in an upstanding rim portion.

Figure 1:
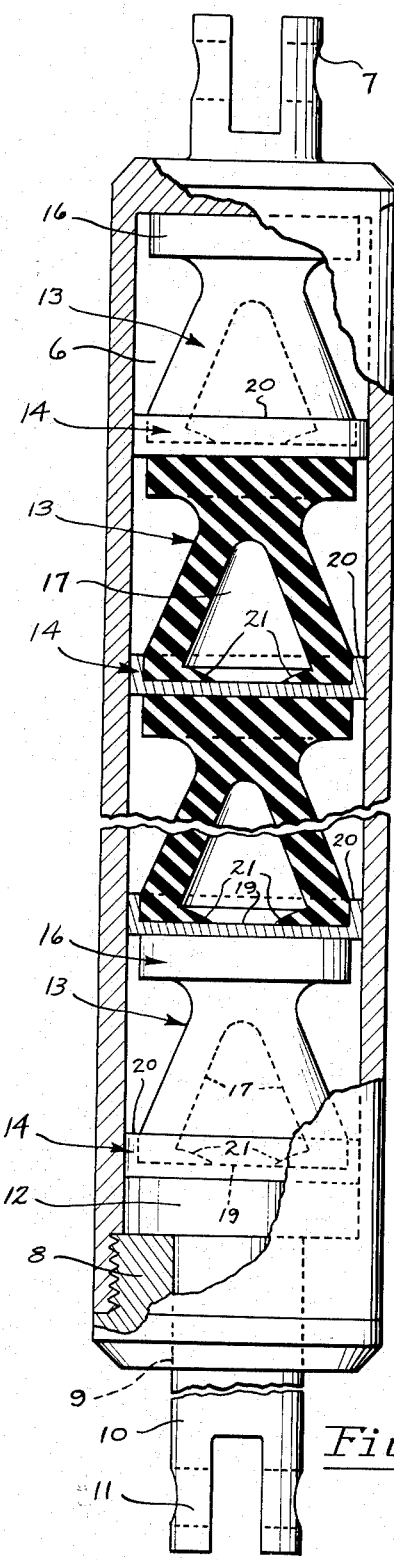
Fig. 1 is a side view, partially broken away and partially in section, showing my spring device or snubber in the extended and relaxed position.

In the drawings, I have shown a preferred embodiment of my spring device wherein an elongated body member 5 is provided with a smooth cylindrical bore 6. One end of the cylindrical bore 6 is closed and a mounting element 7 is formed integral therewith. The opposite end of the bore 6, on the other hand, is closed by means of a threaded cap member 8 having a cylindrical aperture 9 axially therein. This aperture 9, in turn, slidably accommodates a rod which terminates in a second mounting element 11. As shown in Fig. 1, the rod 10 is foreshortened, the actual length thereof being approximately two-thirds the length of the body member 5 in order that the mounting element 11 will, at all times, remain outside the bore 6.

Progressing to the interior of the body member 5, a piston member 12 is carried by the rod 10 and this piston member slidably is accommodated within the cylindrical bore 6 for rectilinear movement therein. Thus, when the spring device functions, the piston member 12 is movable between the extended position of Fig. 1, wherein it abuts the threaded cap 8, to the deformed or compressed position of Fig. 2, wherein it is spaced longitudinally from the cap.

Intermediate the piston member 12 and the closed end of the body member 5, a plurality of stacked compression resistant units are mounted. In accord with one object of my invention, each of these units provides a dual resistance to compression or to movement of the piston from the position of Fig. 1 to the position of Fig. 2 by utilizing both the compression of entrapped air and the resistance to flexing of resilient deformable elements. Thus, each compression resistant unit includes a resilient cup member 13 which is formed of rubber or the like and a stiff circular disk member 14 which is formed of metal or of a tough plastic material. Further, each of the disk members 14 slidably is fitted within the smooth cylindrical bore 6 for movement longitudinally thereof and, during such movement, the resilient cup members 13 are deformed and flexed.

In detail (see Fig. 3), each of the resilient cup members is provided with a conical body 15 and with an enlarged circular head 16 which extends laterally out from the apex of the conical body. Internally, the conical body of each resilient cup member bounds an open conical bore 17, the base of which is defined by a circular peripheral lip 18, an annular flange portion 21 extending inwardly therefrom. Similarly, each of the circular disk members 14 (see Fig. 4) carries a smooth plane upper face 19 which terminates peripherally in an upstanding rim portion 20. In size, the peripheral lip 18 of each resilient cup member is made to fit tightly and sealingly within the upstanding rim portion 20 on a corresponding one of the disk members 14. Further, the base of the annular flange portion 21 rests upon the plane face 19 so as to seal thereagainst when a compressive force is exerted upon the cup member. In this manner, the conical bore 17 effectively is sealed off and air which is entrapped and compressed therein is prevented from escaping.

In assembling one of the spring devices of my invention, the threaded cap 8 is removed from the end of the body member 5 and the various resilient cup members 13 and circular disk members 14 are stacked in correlated relationship as shown in Fig. 1. Thereafter, the rod 10 and piston member 12 are assembled with the threaded cap 8 and this entire assembly is joined with the body member 5. Such an assembly makes evident several factors which contribute to the efficiency of the spring device. Firstly, the enlarged circular head 16 of the endmost resilient cup member 13 rests upon the end of the cylindrical bore 6 and the remaining circular heads each support one of the disk members 14. The end disk member 14, in turn, rests upon the piston member 12 and the peripheral lip 18 on each cup member fits within the upstanding rim portion 20 on a corresponding one of the disk members. This latter disposition of elements is of critical importance to my invention. Thus, as previously mentioned, the upper face 19 of each circular disk is plane and smooth and the peripheral lip 18 and annular flange 21 on the adjoining cup member fit quite tightly thereagainst. For these reasons, the open conical bore 17 of each cup member is sealed in order to define an air chamber. That is to say, air which is entrapped within each of the conical bores 17 when the spring device is assembled will be compressed when the piston head 12 moves from the position in Fig. 1 to the position of Fig. 2. Initially, as a comparison of these two figures will indicate, the annular flange 21 is pressed down against the face 19. That is to say, as a compressive force first is exerted upon the cup member, the walls begin to flex and bulge outwardly. However, since the rim 20 prevents lateral movement of the lip portion 18, the entire wall of the cup acts like a bell crank or lever, the upper portion of the wall moving laterally out and thus forcing the annular flange 21 downwardly. Further, the greater the compressive force, the tighter the cup member and the annular flange are pressed against the face 19. This is an important feature of my invention and the compression of air in each of the resilient cup members 13 which thereby is assured and is sealed against escape is a first element in the resistance to compression of the spring device.

Figure 2:
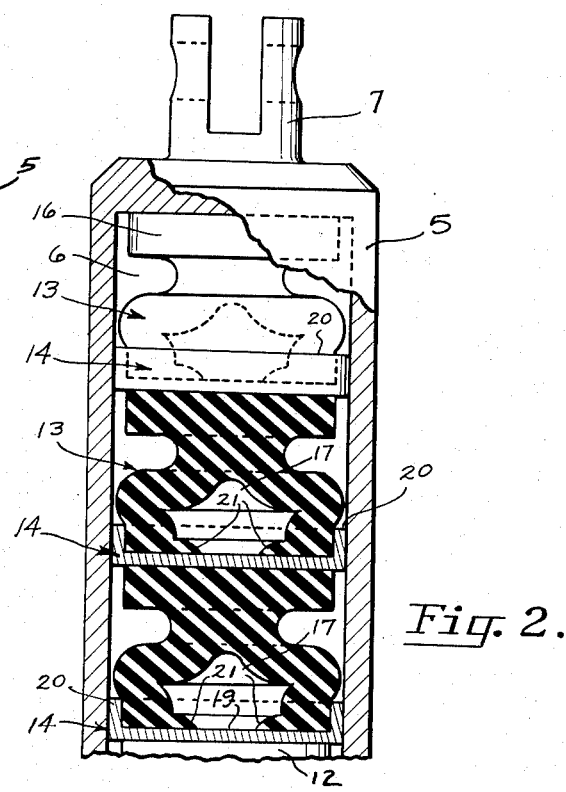
Fig. 2 is a similar view which is foreshortened and partially broken away in order to show the spring device of Fig. 1 in the deformed or compressed position and in order to indicate the dual resistance of the entrapped air and the flexing of the walls of the resilient elements.

The second element of resistance is illustrated in Fig. 2 wherein it is shown that the wall which bounds the conical body 15 of each cup member flexes and bulges laterally out under compressive forces. In function, this bulging is similar to that which takes place when any rubber or similar resilient material is compressed. However, in accord with another important feature of my invention, the upstanding rim portion 20 on each disk member prevents the bulging cup member from coming into physical contact with the smooth cylindrical bore 6. That is to say, the upstanding rim portion 20 confines the lateral flexure of the corresponding cup member 13 so the latter cannot bulge laterally beyond the peripheral outline of the former. In this manner, I have eliminated substantially all rubbing contact and, if the friction between the disk members 14 and the cylindrical bore be ignored, I have eliminated all kinetic friction from my spring device. In further function, the elimination of friction assures a rather quick return to the original position when the load upon the device is removed.

In use, my spring device may serve diverse functions. For example, the mounting elements 7 and 11 may be secured intermediate a vibrating piece of machinery and the base or suspension therefor. In this case, the normal position of the various elements will be intermediate the position of Fig. 1 and Fig. 2 or will be somewhat similar to the latter position. That is to say, vibration of the machinery will cause the various resilient cup members 13 to flex and to bulge as the piston member 12 moves back and forth rectilinearly within the smooth cylindrical bore 6. When increased compressive forces are exerted upon the spring device, the piston member 12 will move inwardly and, when these forces let up somewhat, the piston member will move back toward the position of Fig. 1. In effecting these various movements, it will be noted that my spring device resists compression and absorbs vibration with a dual function. Firstly, the resilient and deformable cup members 13 bulge laterally out and flex back and forth from the position of Fig. 1 to the position of Fig. 2. In so doing, however, the upstanding rim portions 20 prevent the periphery of the cup members from coming into actual rubbing contact with the smooth cylindrical bores 6. Secondly, air which is entrapped within the open conical bores 17 is compressed as the cup members deform since the peripheral lip on each cup is in sealing contact with the smooth plane upper face 19 of each disk member. There is thus provided a minimum resistance to compression yet a large overall movement of the piston 12 is accommodated without utilizing kinetic friction or rubbing contact of one part with another. In actual use, this spring device has been found to possess many advantages in diverse industrial applications. Further, in contrast with a conventional metallic compression spring, the effective life of my spring device is quite long and the resistance to compression thereof is uniform over that life span even with severe usage.

I claim:

1. A compound spring device, comprising a hollow body member having an elongated smooth cylindrical bore in which slidably is mounted a piston member, said smooth bore slidably accommodating a stacked plurality of resilient and deformable cup members spaced longitudinally one from another by a plurality of stiff circular disk members, each circular disk having an upstanding rim portion, each resilient cup member having a conical hollow bore open to one end thereof and defining an air chamber, a circular peripheral lip bounding the base of each said conical bore, each said peripheral lip being slidably retained within a corresponding one of said upstanding rim portions, said cup members being smaller in diameter than said smooth bore and being spaced therefrom in deformed as well as extended condition.

2. A spring device, comprising a hollow body member having an elongated smooth cylindrical bore, a movable piston member mounted within said cylindrical bore, said smooth bore slidably accommodating a stacked plurality of resilient and deformable cup members which are spaced longitudinally one from another by a plurality of stiff circular disk members, said cup members being deformed when said piston is moved within said bore, each circular disk having a smooth plane face which terminates peripherally on an upstanding rim portion, each resilient cup member having a conical body bounding an open conical bore to define an air chamber and further having an enlarged circular head which extends laterally out from the apex thereof, the base of said conical bore being bounded by a circular peripheral lip which rests upon the smooth plane face of a corresponding one of said disks and slidably is retained within the rim upstanding therefrom, said cup members being smaller in diameter than said smooth bore and being spaced therefrom in deformed as well as extended condition, said piston member being arranged to bear against one of said disks and the enlarged circular head of one of said cup members being arranged to bear against the opposite end of said cylindrical bore so that movement of said piston will deform said cup members and compress the air trapped in the air chambers thereof.

3. A compression resistant spring device, comprising a resilient cup member formed of rubber or the like and having a conical body adapted for compression in a direction axially of the conical shape, a conical bore opening in from the base of said conical body and terminating adjacent the apex thereof, the base of said body and bore being defined and bounded by a circular peripheral lip, and a stiff circular disk member having a smooth plane face which terminates peripherally in an upstanding circular rim portion, said circular peripheral lip being rested sealingly upon said plane face and the outer periphery thereof being rested sealingly in abutment with the inner periphery of said circular rim portion, the outer periphery of said circular rim portion exceeding in dimension the greatest girth of said cup member in the axially compressed position of the cup member.

4. In a compound spring device having an elongated smooth cylindrical bore in which is stacked a plurality of two piece compression resistant units, the first piece of each unit including a resilient conical cup member which is deformable in response to a compressive force exerted thereon in an axial direction, a conical bore opening in from the base of each conical cup member and defining an air entrapment chamber, the second piece of each unit including a circular disk member slidable longitudinally in said smooth cylindrical bore and having a plane face terminating peripherally in an upstanding rim, each said plane face sealingly abutting the base of a corresponding one of said conical bore air chambers and each said rim confining the base of the same cup member against deformation laterally beyond the peripheral outline of the disk member.

5. A spring device, comprising a hollow body member having an elongated smooth cylindrical bore, a movable piston member mounted within said cylindrical bore, said smooth bore slidably accommodating a stacked plurality of resilient and deformable cup members which are spaced longitudinally one from another by a plurality of stiff circular disk members, said cup members being deformed when said piston is moved within said bore, each circular disk having a smooth plane face which terminates peripherally on an upstanding rim portion, each resilient cup member having a conical body bounding an open conical bore to define an air chamber and further having an enlarged circular head which extends laterally out from the apex thereof, the base of said conical bore being bounded by a circular peripheral lip having an inner annular flange which rests upon the smooth plane face of a corresponding one of said disks and slidably is retained within the rim upstanding therefrom, said cup members being smaller in diameter than said smooth bore and being spaced therefrom in deformed as well as extended condition, said piston member being arranged to bear against one of said disks and the enlarged circular head of one of said cup members being arranged to bear against the opposite end of said cylindrical bore so that movement of said piston will deform said cup members and compress the air trapped in the air chambers thereof.

References Cited in the file of this patent

UNITED STATES PATENTS

| | | |
|---|---|---|
| 1,869,793 | Bailey | Aug. 2, 1932 |
| 2,115,458 | Geyer | Apr. 26, 1938 |
| 2,486,741 | Gabriel | Nov. 1, 1949 |
| 2,537,634 | Brown | Jan. 9, 1951 |

FOREIGN PATENTS

| | | |
|---|---|---|
| 243,079 | Great Britain | Nov. 23, 1925 |
| 662,260 | Great Britain | May 25, 1949 |
| 357,395 | Italy | Mar. 14, 1938 |
| 460,469 | Italy | Nov. 30, 1950 |